(12) United States Patent
Takahashi et al.

(10) Patent No.: US 6,994,103 B2
(45) Date of Patent: Feb. 7, 2006

(54) FILL-UP CONTROL VALVE STRUCTURE

(75) Inventors: Tetsuya Takahashi, Tochigi-ken (JP); Koji Miwa, Toyota (JP); Takashi Ishikawa, Okazaki (JP)

(73) Assignee: Kyosan Denki Co., Ltd., Ibaraki-Pref. (JP)

( * ) Notice: Subject to any disclaimer, the term of this patent is extended or adjusted under 35 U.S.C. 154(b) by 0 days.

(21) Appl. No.: 10/784,255

(22) Filed: Feb. 24, 2004

(65) Prior Publication Data

US 2004/0221890 A1 Nov. 11, 2004

(30) Foreign Application Priority Data

Feb. 24, 2003 (JP) .............................. 2003-046091

(51) Int. Cl.
*F16K 24/04* (2006.01)
(52) U.S. Cl. ........................................ 137/202; 137/43
(58) Field of Classification Search ................... 137/43, 137/202

See application file for complete search history.

(56) References Cited

U.S. PATENT DOCUMENTS

| 6,016,827 A | * | 1/2000 | Dawson ..................... 137/202 |
| 6,655,403 B2 | * | 12/2003 | Mills .......................... 137/202 |
| 2003/0098063 A1 | * | 5/2003 | Mori et al. ................ 137/202 |

FOREIGN PATENT DOCUMENTS

JP 8-258577 10/1996

* cited by examiner

*Primary Examiner*—Kevin Lee
(74) *Attorney, Agent, or Firm*—Clark & Brody (57) ABSTRACT

A fill-up control valve structure includes a casing attached to a fuel tank, a float provided in a space defined in the casing so as to cause an up-and-down movement, a valve body provided at an upper portion of the float, a ventilation passage communicating with a downstream side of the valve body, and at least one first ventilation hole opened at a lower part of the casing to connect the inner space of the casing and the fuel tank to introduce fuel from the fuel tank into the space. Furthermore, at least one second ventilation hole is provided at an upper part of the casing to connect the inner space of the casing and the fuel tank. The hole size of second ventilation hole is smaller than that of the first ventilation hole.

4 Claims, 5 Drawing Sheets

FILL-UP CONTROL VALVE STRUCTURE

BACKGROUND OF THE INVENTION

The present invention relates to a fill-up control valve structure provided in a ventilation passage connecting a fuel tank and a canister, and more particularly to the structure for a fill-up control valve capable of functioning as a fuel leak prevention valve for suppressing pressure change occurring in a fuel tank.

An automotive vehicle is usually equipped with a fuel tank storing the fuel to be supplied into a combustion chamber of an engine. The fuel tank is equipped with a ventilation system so that air is introduced into or discharged from the inside space of the fuel tank in accordance with increase or decrease of the fuel amount in the fuel tank. The ventilation system connects the inside space of the fuel tank and the canister. Therefore, if the fuel tank is filled with the fuel, there is the possibility that the fuel may overflow into the canister. If the canister is soaked with the fuel, the canister will be no longer usable. In view of the above, a fill-up control valve is provided at the upper portion of the fuel tank to shut off the ventilation system when the fuel tank is filled up to prevent the air and the fuel from being conveyed into the canister.

Furthermore, in addition to the above-described fill-up control valve, the fuel tank is equipped with a fuel leak prevention valve which is usually in an opened condition to connect the inside space of the fuel tank to the outside air to eliminate or adjust the pressure change occurring in the fuel tank and is closed in an event that the automotive vehicle is inclined or rolled over.

In general, the fuel tank is installed in a limited dead space available in the automotive vehicle which requires many essential engine components to be installed together with the fuel tank. Thus, the fuel tank tends to be configured into a thin and irregular shape. Accordingly, when the automotive vehicle is inclined, there is the possibility that a thin fuel tank may have a closed inside space temporarily at its front or rear end depending on the direction of vehicle inclination. If the fuel leak prevention valve is not located at this temporarily formed closed space, the fuel tank may deform.

Therefore, some of conventional fuel tanks are equipped with two or more fuel leak prevention valves. Furthermore, a fuel pump unit is attached to the fuel tank.

Figure 9:
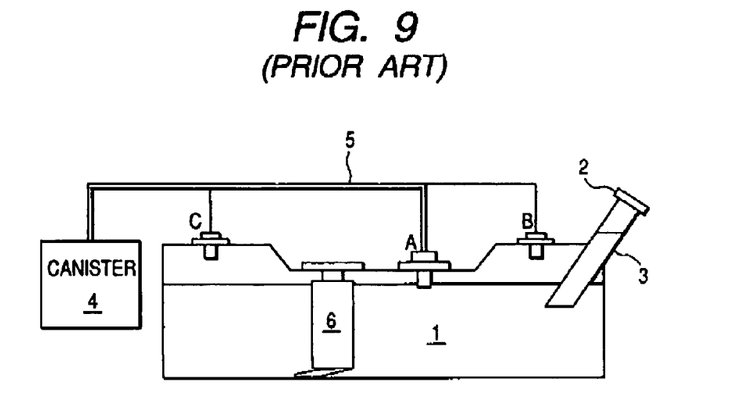
FIG. 9 is a schematic diagram showing a conventional fuel tank equipped with the fill-up control valve, the fuel leak prevention valve, and the fuel pump unit.

FIG. 9 shows a conventional fuel tank with a fill-up control valve. A fuel tank 1, installed on an automotive vehicle, stores fuel to be supplied into an engine. A fill-up control valve A is disposed at the upper portion of the fuel tank 1. The fill-up control valve A is connected via a ventilation passage 5 to a canister 4. The fuel tank 1 has a fuel feed pipe 3 with a filler cap 2 attached at its distal end so that the tank can be occasionally refilled with additional fuel via the fuel feed pipe 3.

The fuel tank 1 has a thin shape extending in a right-and-left direction in the drawing, with a recessed portion formed at its center. A fuel pump unit 6 and a fill-up control valve A are provided at the central recessed portion. Two fuel leak prevention valves B and C are disposed on swelled portions formed at the right and left sides of the fuel tank 1.

Figure 7:
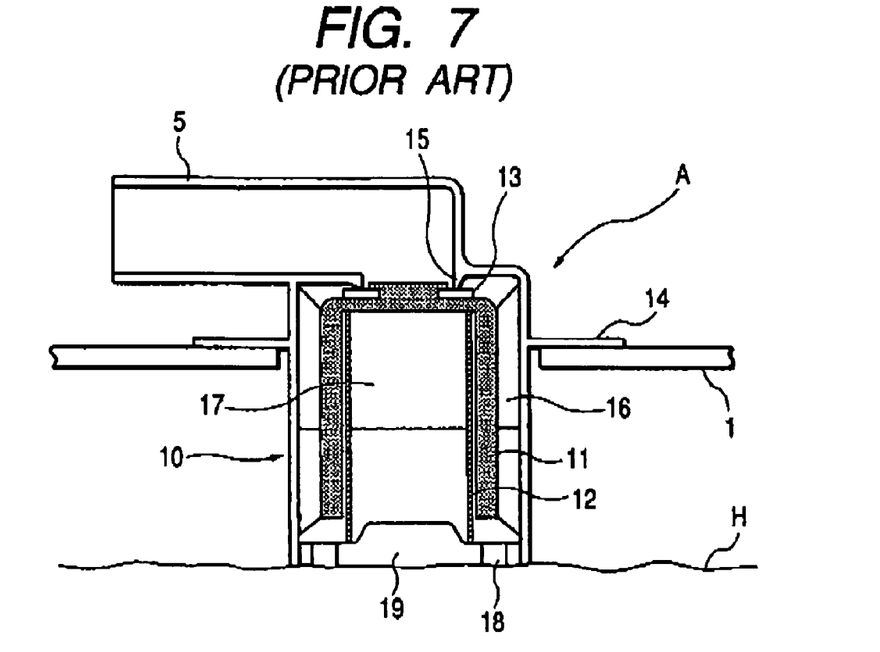
FIG. 7 is a cross-sectional view showing a conventional fill-up control valve.

FIG. 7 shows the detailed arrangement of the fill-up control valve A. The fill-up control valve A includes a casing 10 provided inside the fuel tank 1, a float 11 disposed in the casing 10, a spring 12 giving a resilient force acting on the float 11 in the upward direction, a valve body 13 attached to the upper portion of the float 11, and a ventilation passage 5 communicating with the downstream side of the valve body 13 at one end and also communicating with the canister 4 at the other end.

The casing 10 has a hollow cylindrical shape with an opened top and an inside space defining a float chamber 17. A valve seat 15 is formed at the upper part of the casing 10. Furthermore, a plurality of vertical ribs 16, provided on the inner cylindrical surface of the casing 10 at equal angular intervals, cooperatively guide the up-and-down movement of the float 11. A bottom plate 19 having at least one ventilation hole 18 is attached to the bottom portion of the casing 10. The casing 10 has a flange 14 extending outward from its outer cylindrical surface. The flange 14 supports the casing 10 to the upper surface of the fuel tank 1.

The fill-up control valve A has the above-described arrangement. When the fuel is supplied into the fuel tank 1 via the fuel feed pipe 3, the fuel surface level in the fuel tank 1 rises. When the fuel surface level reaches the bottom plate 19, the fuel enters into the inside space of the casing 10 via the ventilation hole 18 of the bottom plate 19. The fuel pushes the float 11 upward. When the fuel surface level reaches a predetermined position in the float chamber 17, the valve body 13 provided on the upper surface of the float 11 is brought into contact with the valve seat 15. Upon the valve body 13 contacting with the valve seat 15, the ventilation passage 5 is closed. Then, the pressure in the fuel tank 1 starts increasing with progress of fuel supply and finally the fuel feed stops when the inside pressure reaches a predetermined level. The fuel surface level at this moment is referred to as "filled-up fuel surface level H."

Figure 8:
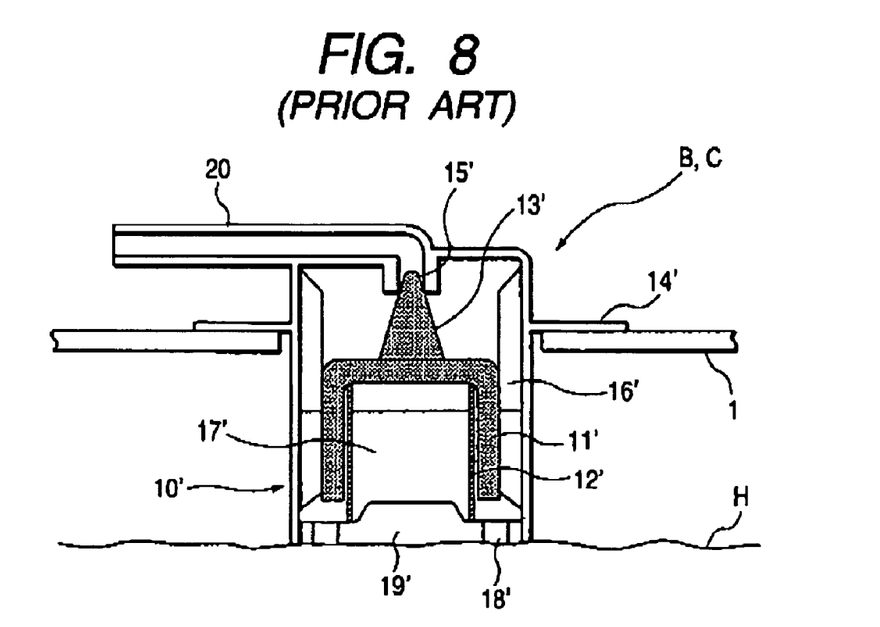
FIG. 8 is a cross-sectional view showing a conventional fuel leak prevention valve.

FIG. 8 shows a schematic arrangement of the fuel leak prevention valves B and C. The fuel leak prevention valve B is disposed at a higher position compared with the above-described fill-up control valve A. A small-diameter passage 20 connects the downstream side of a valve body 13' to the ventilation passage 5 shown in FIG. 9. The valve body 13' of the fuel leak prevention valves B and C is different in configuration from the valve body 13 of the fill-up control valve A. The rest of the arrangement of the fuel leak prevention valves B and C is substantially the same as that of the fill-up control valve A.

More specifically, as respective fuel leak prevention valves B and C are positioned high compared with the fill-up control valve A, these valves B and C are not closed during the fuel feeding operation and accordingly are always in the opened condition. When the fuel tank 1 is inclined, a closed space is temporarily formed at either upper part of the fuel tank 1. In such a case, each of the fuel leak prevention valves B and C, being disposed on the upper surface of the fuel tank 1 via a flange 14', connects the temporarily closed space to the canister 4 via the small-diameter passage 20. Thus, the pressure change in the fuel tank 1 can be suppressed. Each of the fuel leak prevention valves B and C may sink in the fuel depending on the direction of the inclined fuel tank 1. In such a case, in the fuel leak prevention valve B or C, the float 11' causes an upper shift movement and the valve body 13' contacts with a valve seat 15' to close the small-diameter passage 20. Thus, no fuel overflows into the canister 4. The rest of the arrangement of respective fuel leak prevention valves B and C, including a casing 10', a spring 12', a float chamber 17', a ventilation hole 18', and a bottom plate 19', are substantially the same as those of the fill-up control valve A. (For example, referred to Japanese Patent Application Laid-open No. 8-258577(1996)).

In general, the fuel tank 1 is made of a material having the capability of protecting permeation of the fuel. On the other hand, the above-described fill-up control valve A and the fuel leak prevention valves B and C as well as the flange used to attach the fuel pump unit 6 to the fuel tank 1 are not made of such fuel-impermeable material. According to the above-described conventional fuel tank 1, the fill-up control valve A and the fuel leak prevention valves B and C are attached on the upper surface of the fuel tank 1. Thus, the above-described conventional fuel tank 1 has many fuel-permeable sources. The fuel permeation amount will increase. In recent years, the rubber packing and other sealing members tend to be replaced with low-permeable type materials. However, completely eliminating the permeation of fuel occurring through these fuel-permeable sources is impossible.

Furthermore, providing a plurality of fuel leak prevention valves or independently attaching the fuel pump unit 6 to the fuel tank 1 will increase the number of constituent parts and will complicate the assembling process. The production cost will increase accordingly.

SUMMARY OF THE INVENTION

In view of the above-described problems, the present invention has an object to provide a fill-up control valve structure capable of reducing the fuel permeation amount and also reducing the total number of constituent parts and simplifying the assembling process. To this end, the present invention arranges the fill-up control valve so as to function as a fuel leak prevention valve, thereby omitting or removing at least one or all of the fuel leak prevention valves. Furthermore, the present invention integrates the fill-up control valve with the flange used for fixing the fuel pump unit to the fuel tank.

In order to accomplish the above and other related objects, the present invention provides a fill-up control valve structure including a casing attached to a fuel tank, a float provided in a space defined in the casing so as to cause an up-and-down movement, a valve body provided at an upper portion of the float, a ventilation passage communicating with a downstream side of the valve body, and at least one first ventilation hole opened at a lower part of the casing to connect the inner space of the casing and the fuel tank to introduce fuel from the fuel tank into the space, wherein at least one second ventilation hole is provided at an upper part of the casing to connect the inner space of the casing and the fuel tank, and a hole size of second ventilation hole is smaller than that of the first ventilation hole.

With the arrangement of at least one second ventilation hole provided at the upper part of the casing to connect the space serving as a float chamber to the fuel tank and having the hole size smaller than that of the first ventilation hole so as to prevent the fuel from flowing into this valve, it becomes possible to promptly equalize the pressure of the float chamber with the pressure of the fuel tank at the end of each fuel feeding operation even when the filled-up fuel brings the valve body into contact with the valve seat so as to form a closed condition. Then, in response to reduction of the pressure in the fuel tank, the valve body is opened.

Thereafter, the fill-up control valve communicating with the large-diameter ventilation passage starts functioning as a fuel leak prevention valve capable of suppressing the change of pressure in the fuel tank. Accordingly, it becomes possible to remove or omit at least one of conventionally used fuel leak prevention valves. In other words, the fuel permeation amount decreases correspondingly. The total number of constituent parts becomes small. The assembling processes can be simplified.

According to a preferred embodiment of the present invention, the casing has a flange through which the casing is attached to the fuel tank, and a fuel pump unit is attached to the flange. According to this arrangement, no special or additional flange is necessary for attaching the fuel pump unit to the fuel tank. The fuel permeation amount decreases correspondingly. The total number of constituent parts becomes small. The assembling processes can be simplified.

According to a preferred embodiment of the present invention, the ventilation passage is connected to another ventilation passage in the vicinity of the valve body, and this another ventilation passage has a hole size smaller than the ventilation passage and has the other end being connected to the fuel tank. This arrangement makes it possible to promptly reduce the pressure difference between the upstream and downstream sides of the valve body occurring when the filled-up fuel in the fuel tank brings this valve body into contact with the valve seat. Thus, this arrangement is effective in opening the valve body quickly so that the fill-up control valve can sufficiently function as the fuel leak prevention valve.

According to a preferred embodiment of the present invention, the valve body provided at the upper portion of the float is constituted by a large-diameter first valve body and a small-diameter second valve body which operate individually. With this arrangement, the small-diameter second valve body opens in response to a small reduction in the fuel tank pressure after the fuel tank is filled up with the fuel. Especially, the fill-up control valve can function as the fuel leak prevention valve at an earlier timing without providing additional small-diameter ventilation passage.

According to a preferred embodiment of the present invention, the first valve body and the second valve body are arranged into a layered structure. This arrangement is effective in downsizing the valve body. The fuel permeation amount decreases correspondingly.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

First Embodiment

Figure 1:
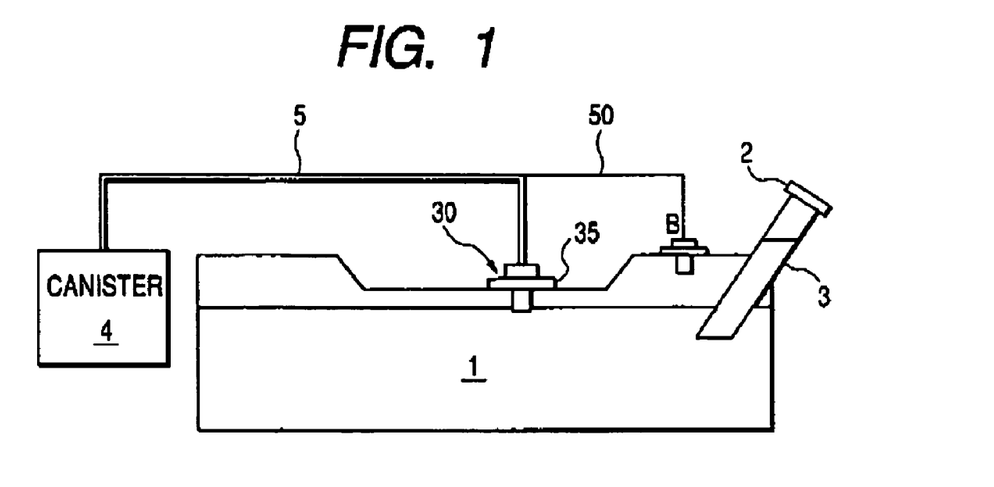
FIG. 1 is a schematic diagram showing an overall arrangement of a fuel tank equipped with a fill-up control valve structure in accordance with a first embodiment of the present invention.
Figure 2:
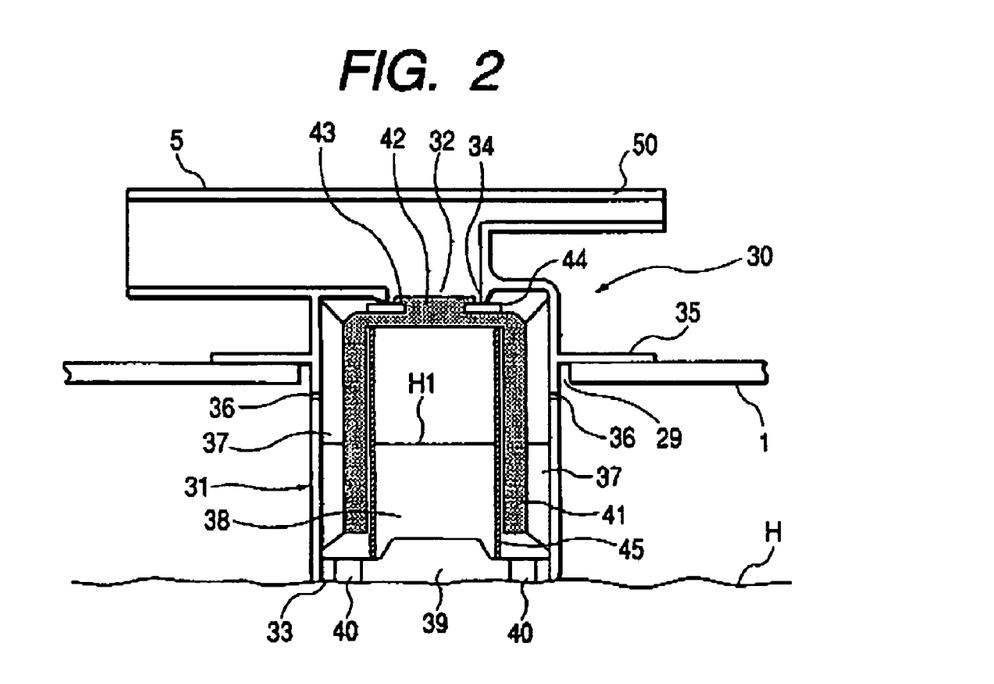
FIG. 2 is a cross-sectional view showing a fill-up control valve device in accordance with the first embodiment of the present invention.

FIG. 1 is a schematic diagram showing an arrangement of a fill-up control valve structure applied to a fuel tank of an automotive vehicle in accordance with a preferred embodiment of the present invention. FIG. 2 is a cross-sectional view showing the fill-up control valve structure in accordance with the preferred embodiment of the present invention.

As shown in FIG. 1, a fill-up control valve device 30 is installed to the fuel tank 1. The fuel tank 1 has only one fuel leak prevention valve B which is positioned high compared with the fill-up control valve incorporated in the fill-up control valve device 30. The fuel leak prevention valve B communicates with the large-diameter ventilation passage 5 via a small-diameter passage 50. The large-diameter ventilation passage 5 is connected to the canister 4.

The fuel tank 1 is a resin-made member. As shown in FIG. 2, a fill-up control valve device 30 and the fuel leak prevention valve B are bonded by thermal melting or the like to the periphery of a corresponding communication port 29 provided on the upper portion of the fuel tank 1. The fuel tank 1 can be made of a metallic member, although the fill-up control valve device 30 and the fuel leak prevention valve B are respectively fixed to the fuel tank 1 by means of appropriate fastening member.

As shown in FIG. 2, the fill-up control valve device 30 includes a casing 31, a float 41, and a spring 45. The casing 31 is a resin-made member which is configured into a hollow cylindrical shape having a small-diameter upper opening 32 and a large-diameter lower opening 33. A valve seat 34 is formed on an inner surface of the small-diameter upper opening 32. A flange 35 is formed on an outer surface of the casing 31 so as to extend outward in radial directions from an upper portion of the casing 31. The fill-up control valve device 30 is attached to the fuel tank 1 via the flange 35. The ventilation passage 5 is integrally connected to the small-diameter upper opening 32. A plurality of vertical ribs 37, provided on the inner cylindrical wall of the casing 31 at equal angular intervals, cooperatively guide the up-and-down movement of the float 41.

A resin-made bottom plate 39 is integrally attached to the lower opening 33 of the casing 31 by thermal melting or the like. Under the condition that the bottom plate 39 is attached to casing 31, an inside space defined in the casing 31 serves as a float chamber 38 allowing the float 41 to cause the up-and-down movement. The bottom plate 39 has a plurality of large-diameter first ventilation holes 40 opened at predetermined angular intervals in the circumferential direction. Each of the first ventilation holes 40 has a function of introducing the fuel into the float chamber 38 during the fuel feeding operation or in an even that an automotive vehicle is inclined or rolled over. The fuel rushing into the float chamber 38, during the fuel feeding operation or in the even that the automotive vehicle is inclined or rolled over, pushes the float 41 and causes the float 41 to move upward. The valve body 44 provided at the upper portion of the float 41 contacts the valve seat 34 and accordingly the ventilation passage 5 is closed. This prevents the fuel from overflowing into the canister 4.

Furthermore, the casing 31 has a plurality of small-diameter second ventilation holes 36 which are provided at an upper part of the casing 31 under the flange 35 and are disposed at predetermined angular intervals in the circumferential direction. The small-diameter second ventilation holes 36 provide spatial communication between the inside space of the fuel tank 1 and the float chamber 38. The small-diameter second ventilation holes 36 are positioned sufficiently high compared with the filled-up fuel surface level H. No fuel enters into the float chamber 38 via the second ventilation holes 36 during the fuel feeding operation. Thus, the second ventilation holes 36 have the function of solely eliminating the pressure difference between the inside space of fuel tank 1 and the float chamber 38.

The float 41 is a resin-made member having a substantially hollow cylindrical shape having a lower opening. The float 41 has a cylindrical small-diameter projection 42 formed on the upper surface. The cylindrical small-diameter projection 42 has an annular groove portion 43 formed along an outer circumferential surface thereof. The valve body 44, which is resin-made and configured into an annular or donut shape, is coupled in this annular groove portion 43. More specifically, the inner peripheral edge of the valve body 44 is coupled with the groove portion 43. When the float 41 reaches the uppermost portion in its upper shift movement, the upper surface of the annular valve body 44 contacts with the valve seat 34 and accordingly the float chamber 38 is isolated from the ventilation passage 5. The annular valve body 44 is attached with some play to the annular groove portion 43, and accordingly the spatial communication between the float chamber 38 and the ventilation passage 5 can be surely shut off even when the float 41 is slightly inclined.

The spring 45, disposed inside the float 41, intervenes between an inner top wall portion of the float 41 and an upper surface of the bottom plate 39. The spring 45 resiliently urges the float 41 to assist the upper shift movement of the float 41. More specifically, the spring force of the spring 45 is so weak that the spring 45 cannot move the float 41 upward in the ordinary condition. However, in the case that the fuel enters inside the float chamber 38, a resultant force of the buoyant force acting on the float 41 and the spring force of the spring 45 causes the float 41 to quickly move upward.

The fill-up control valve device 30 of this embodiment functions in the following manner. When the fuel is supplied into the fuel tank 1 equipped with the fill-up control valve device 30 from the fuel feed pipe 3 shown in FIG. 1, the air residing in the fuel tank 1 exits via the fill-up control valve device 30 to the ventilation passage 5. The canister 4, located at the downstream side of the ventilation passage 5, adsorbs the fuel vapor contained in the discharged air.

Subsequently, the fuel surface level in the fuel tank 1 rises in accordance with discharge of the residual air from the fuel tank 1 and finally reaches the filled-up fuel surface level H. The bottom plate 39 of the fill-up control valve device 30 is arranged so as to be positioned at the same height as the filled-up fuel surface level H. Thus, the first ventilation holes 40 of the bottom plate 39 are soaked in the fuel and accordingly the discharge of air via the first ventilation holes 40 is stopped at this moment.

Thereafter, the pressure in the fuel tank 1 increases and accordingly the fuel enters inside the float chamber 38. As a result, the float 41 causes the upper shift movement in accordance with the fuel amount entering inside the float chamber 38. The valve body 44 disposed on the upper surface of the float 41 is soon brought into contact with the valve seat 34. Accordingly, the upper shift movement of the float 41 is stopped. The fuel having entered in the float chamber 38 maintains the altitudinal position of the liquid level H1. Thereafter, the pressure in the fuel tank 1 further increases and finally stops the fuel feeding operation automatically. Thereafter, in accordance with reduction of the pressure in the fuel tank 1, the liquid level H1 in the float chamber 38 falls down to the filled-up fuel surface level H.

In this case, if there are no second ventilation holes 36 opened on the side wall portion of the casing 31, the inside space of the float chamber 38 will become a closed space. The pressure in the float chamber 38 will push the float 41 upward and the valve body 44 is brought into contact with the valve seat 34. As the valve body 44 is not released from the valve seat 34 in this case, the fill-up control valve device 30 cannot function as a fuel leak prevention valve.

On the other hand, the above-described embodiment of the present invention provides the small-diameter second ventilation holes 36 opened at the upper portion of the casing 31 under the flange 35 where the second ventilation holes 36 are not soaked into the fuel and surely provide the spatial communication between the inside space of fuel tank 1 and the float chamber 38. The inside pressure of the float chamber 38 is immediately equalized with the inside pressure of the fuel tank 1. Thus, the inside pressure of the float chamber 38 can promptly follow the reduction of the inside pressure of the fuel tank 1. As a result, the valve body 44 is released from the valve seat 34. The spatial communication among the float chamber 38, the fuel tank 1, and the ventilation passage 5 is established. Accordingly, the fill-up control valve device 30 can function as the fuel leak prevention valve.

Although the provision of the fuel leak prevention valve is not essential, providing at least one fuel leak prevention valve B on the upper surface of the fuel tank 1 as shown in FIG. 1 is desirable in that the fill-up control valve device 30 can immediately function as a fuel leak prevention valve.

More specifically, the fuel leak prevention valve B has a function of communicating the inside space of fuel tank 1 to the ventilation passage 5 via the small-diameter passage 50. When the fuel feeding operation is finished in the condition shown in FIG. 2, the inside pressure of the fuel tank 1 immediately decreases via the small-diameter passage 50. The inside pressure of the float chamber 38 immediately decreases via the second ventilation holes 36, too. As a result, the valve body 44 is released from the valve seat 34. Thereafter, the fill-up control valve device 30 can function as the fuel leak prevention valve. Accordingly, leaving at least one fuel leak prevention valve B on the upper surface of the fuel tank 1 is effective in that the fill-up control valve device 30 can start functioning as the fuel leak prevention valve at an early timing. Even in this arrangement, the total number of the fuel leak prevention valves is small compared with the conventional arrangement.

Figure 3:
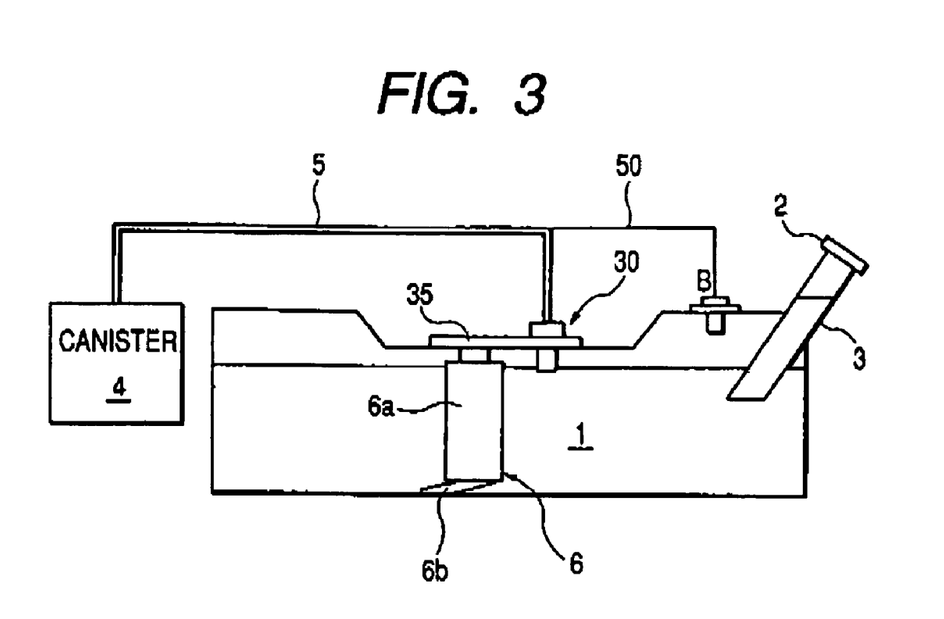
FIG. 3 is a schematic diagram showing an assembled condition of the fill-up control valve device shown in FIG. 2 and a fuel pump unit in accordance with the first embodiment of the present invention.

FIG. 3 is a schematic view showing an integrated arrangement of the fill-up control valve device 30 and the fuel pump unit 6. As shown in FIG. 3, the fuel pump unit 6 includes a pump main body 6a and a filter 6b attached to the bottom portion of the pump main body 6a. The fuel pump unit 6 is attached to the upper portion of the fuel tank 1 via the flange 35.

According to the arrangement shown in FIG. 3, the flange 35 of the fill-up control valve device 30 is used to attach the fuel pump unit 6 to the upper portion of the fuel tank 1. Thus, it becomes possible to reduce the area required to attach the fill-up control valve device 30 and the fuel pump unit 6 to the fuel tank 1. Furthermore, the number of required flange parts can be reduced, and accordingly the required assembling processes can be simplified.

Second Embodiment

Figure 4:
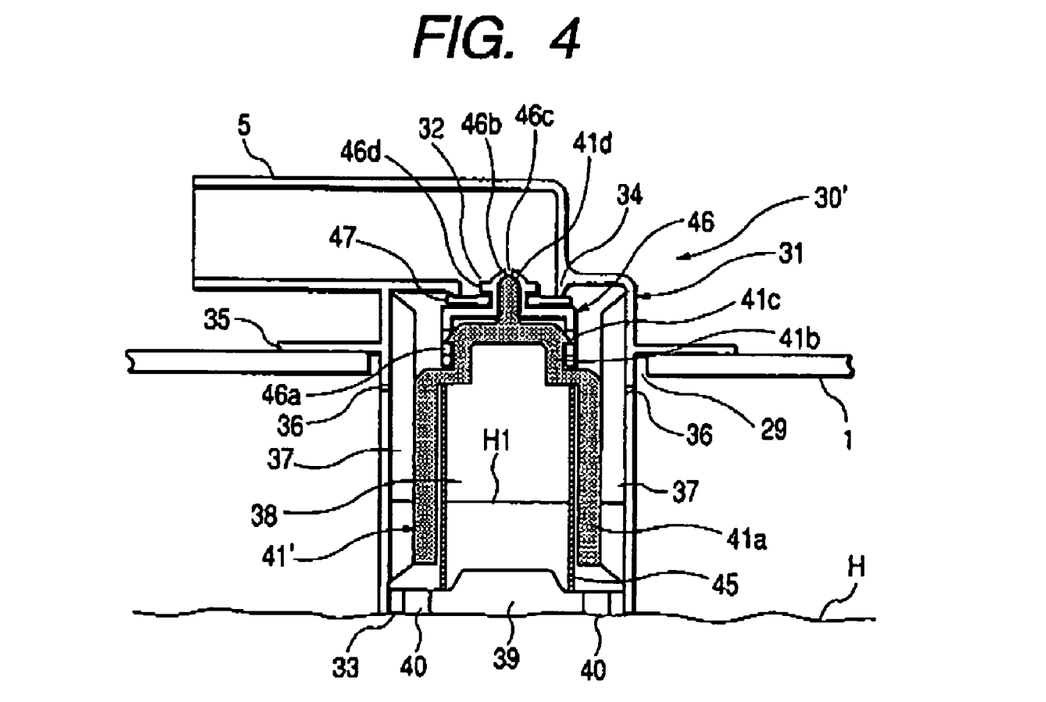
FIG. 4 is a cross-sectional view showing a fill-up control valve device in accordance with a second embodiment of the present invention.
Figure 5:
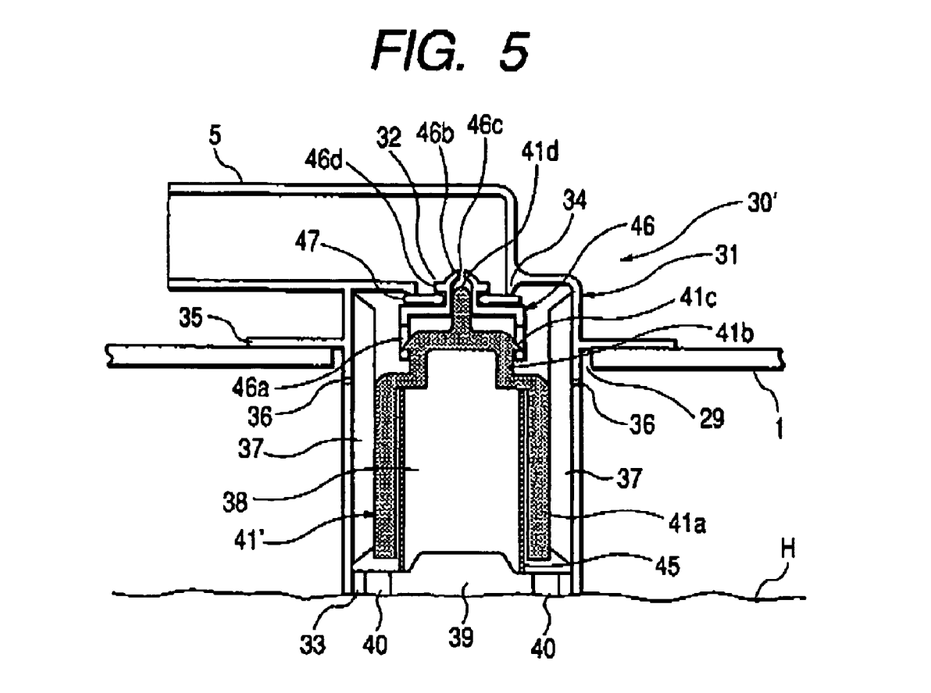
FIG. 5 is a cross-sectional view showing the fill-up control valve device in accordance with the second embodiment of the present invention, wherein a small-diameter valve body is in an opened condition.
Figure 6:
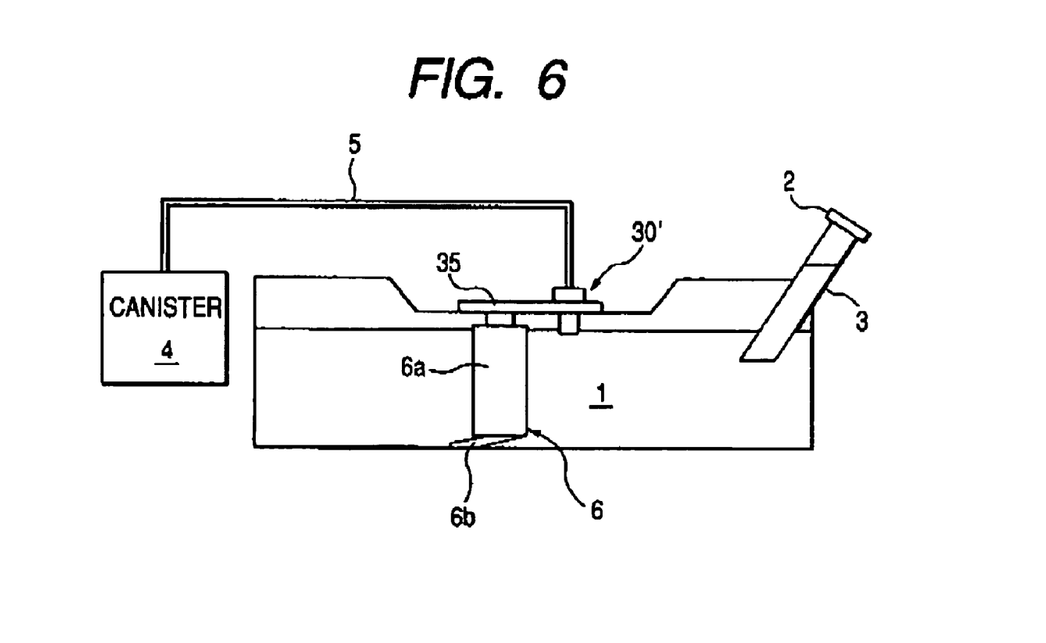
FIG. 6 is a schematic diagram showing an assembled condition of the fill-up control valve device shown in FIG. 5 and a fuel pump unit in accordance with the second embodiment of the present invention.

FIGS. 4 to 6 show a fill-up control valve structure in accordance with a second embodiment of the present invention. The fill-up control valve structure of the second embodiment is characterized in that the valve body provided at the upper portion of the float consists of a large-diameter first valve body and a small-diameter second valve body which can function individually. No conventional fuel leak prevention valves are provided. FIG. 4 is a cross-sectional view showing the fill-up control valve device in which both of the first and second valve bodies are in the closed condition. FIG. 5 is a cross-sectional view showing the fill-up control valve device in which only the small-diameter second valve body is in the opened condition. FIG. 6 is a schematic view showing the fill-up control valve device installed in the fuel tank. In the drawings, the components disclosed in the first embodiment are denoted by the same reference numerals.

The fuel tank 1 is a resin-made member. A fill-up control valve device 30' is bonded by thermal melting or the like to the periphery of a corresponding communication port 29 provided on the upper portion of the fuel tank 1.

As shown in FIG. 4, the fill-up control valve device 30' includes a casing 31, a float 41', and a spring 45. The casing 31 is a resin-made member which is configured into a hollow cylindrical shape having a small-diameter upper opening 32 and a large-diameter lower opening 33. A valve seat 34 is formed on an inner surface of the small-diameter upper opening 32. A flange 35 is formed on an outer surface of the casing 31 so as to extend outward in radial directions from an upper portion of the casing 31. The fill-up control valve device 30' is attached to the fuel tank 1 via the flange 35. The ventilation passage 5 is integrally connected to the small-diameter upper opening 32. A plurality of vertical ribs 37, provided on the inner cylindrical wall of the casing 31 at equal angular intervals, cooperatively guides the up-and-down movement of the float 41'.

A resin-made bottom plate 39 is integrally attached to the lower opening 33 of the casing 31 by thermal melting or the like. Under the condition that the bottom plate 39 is attached to casing 31, an inside space defined in the casing 31 serves as a float chamber 38 allowing the float 41' to cause the up-and-down movement. The bottom plate 39 has a plurality of large-diameter first ventilation holes 40 opened at predetermined angular intervals in the circumferential direction. Each of the first ventilation holes 40 has a function of introducing the fuel into the float chamber 38 during the fuel feeding operation or in an even that an automotive vehicle is inclined or rolled over. The fuel rushing into the float chamber 38, during the fuel feeding operation or in the even that the automotive vehicle is inclined or rolled over, pushes the float 41' and causes the float 41' to move upward. Two, large and small, valve bodies being layered in the up-and-down direction and provided at the upper portion of the float 41' contact the valve seat 34 and accordingly the ventilation passage 5 is closed. This prevents the fuel from overflowing into the canister 4.

Furthermore, the casing 31 has a plurality of small-diameter second ventilation holes 36 which are provided at an upper part of the casing 31 under the flange 35 and are disposed at predetermined angular intervals in the circumferential direction. The small-diameter second ventilation holes 36 provide spatial communication between the inside space of the fuel tank 1 and the float chamber 38. The small-diameter second ventilation holes 36 are positioned sufficiently high compared with the filled-up fuel surface level H. No fuel enters into the float chamber 38 via the second ventilation holes 36 during the fuel feeding operation. Thus, the second ventilation holes 36 have the function of solely eliminating the pressure difference between the inside space of fuel tank 1 and the float chamber 38.

The float 41' is a resin-made member having a substantially hollow cylindrical shape having a large-diameter cylindrical portion 41a at its lower end and small-diameter cylindrical portion 41b at its upper end. The large-diameter cylindrical portion 41a has a constant diameter when taken along a plane perpendicular to the axial direction. An outer cylindrical surface of the large-diameter cylindrical portion 41a is loosely supported by the vertical ribs 37 provided on the inner wall surface of the casing 31, so that the large-diameter cylindrical portion 41a can cause an up-and-down movement along the vertical ribs 37. Furthermore, the small-diameter cylindrical portion 41b has a plurality of engaging pieces 41c protruding outward in radial directions from its outer cylindrical surface. Furthermore, the small-diameter cylindrical portion 41b has a small-diameter second valve body 41d standing from the center of its upper surface. The small-diameter second valve body 41d is configured into a straight rod shape with a semispherical top.

A large-diameter first valve body 46 is disposed in the vicinity of the small-diameter cylindrical portion 41b of the float 41'. The first valve body 46 is a resin-made member configured into a substantially hollow cylindrical shape with a lower opening. The first valve body 46 has a plurality of engaging grooves 46a formed on its side wall surface. The grooves 46a are engageable with the engaging pieces 41c formed on the cylindrical surface of the small-diameter cylindrical portion 41b of the float 41'. A concave portion 46b is formed at the center on the upper surface of the first valve body 46. The small-diameter second valve body 41d formed on the small-diameter cylindrical portion 41b of the float 41' is coupled into the concave portion 46b of the first valve body 46. The concave portion 46b has a small opening 46c opened at the upper end which provides spatial communication between the float chamber 38 and the ventilation passage 5.

Furthermore, a groove portion 46d is formed on the outer cylindrical surface of the concave portion 46b. An annular packing 47 is coupled in the groove portion 46d. When the float 41' causes an upper shift movement, the packing 47 contacts with the valve seat 34 formed on the inner top surface of the casing 31. After this moment, no air and fuel can exit out of the casing 31 into the ventilation passage 5. In this case, the packing 47 is loosely coupled into the groove portion 46d in the back-and-forth direction as well as in the right-and-left direction. Thus, even if the float 41' is inclined, the hermetical sealing between the packing 47 and valve seat 34 can be properly maintained.

The assembling of the float 41' and the first valve body 46 is performed in the following manner.

The first valve body 46 is placed on the upper portion of the float 41', and then a pressing force is applied on the upper portion of the first valve body 46 to cause a downward slide movement of the first valve body 46. The first valve body 46 is thus depressed downward along the outer cylindrical surface of the small-diameter cylindrical portion 41b of the float 41', and finally the engaging pieces 41c provided on the outer cylindrical surface of the small-diameter cylindrical portion 41b of the float 41' are locked into the engaging groove 46a of the first valve body 46. As a result, the first valve body 46 is firmly fixed with the float 41'. Subsequently, the packing 47 is coupled into the groove portion 46d of the first valve body 46, thereby accomplishing the assembling of the first valve body 46.

In the condition that the float 41' and the first valve body 46 are assembled, the upper end of the small-diameter second valve body 41d formed at the center of the upper surface of the float 41' is brought into single-point contact with the small opening 46c opened at the upper end of the groove portion 46d of the first valve body 46. The second valve body 41d closes the small opening 46c in this condition. Accordingly, even if the float 41' is in the inclined condition, the second valve body 41d can hermetically closes the small opening 46c. When the float 41' reaches the uppermost portion in its upper shift movement, the annular packing 47 is brought into contact with the valve seat 34 as shown in FIG. 4. Accordingly, the spatial communication between the float chamber 38 and the ventilation passage 5 can be surely shut off The spring 45, disposed inside the float 41', intervenes between an inner top wall portion of the float 41' and an upper surface of the bottom plate 39. The spring 45 resiliently urges the float 41' to assist the upper shift movement of the float 41'. More specifically, the spring force of the spring 45 is so weak that the spring 45 cannot move the float 41' upward in the ordinary condition. However, in the case that the fuel enters inside the float chamber 38, a resultant force of the buoyant force acting on the float 41' and the spring force of the spring 45 causes the float 41' to quickly move upward.

The fill-up control valve device 30' of this embodiment functions in the following manner. When the fuel is supplied into the fuel tank 1 equipped with the fill-up control valve device 30' from the fuel feed pipe 3, the air residing in the fuel tank 1 exits via the fill-up control valve device 30' to the ventilation passage 5. The canister 4, located at the downstream side of the ventilation passage 5, adsorbs the fuel vapor contained in the discharged air.

Subsequently, the fuel surface level in the fuel tank 1 rises in accordance with discharge of the residual air from the fuel tank 1 and finally reaches the filled-up fuel surface level H. The bottom plate 39 of the fill-up control valve device 30' is arranged so as to be positioned at the same height as the filled-up fuel surface level H. Thus, the first ventilation holes 40 of the bottom plate 39 are soaked in the fuel and accordingly the discharge of air via the first ventilation holes 40 is stopped at this moment.

Thereafter, the pressure in the fuel tank 1 increases and accordingly the fuel enters inside the float chamber 38. As a result, the float 41' causes the upper shift movement in accordance with the fuel amount entering inside the float chamber 38. The packing 47 coupled around the first valve body 46 disposed on the upper surface of the float 41' is soon brought into contact with the valve seat 34. Accordingly, the upper shift movement of the float 41' is stopped. The fuel having entered in the float chamber 38 maintains the altitudinal position of the liquid level H1. Thereafter, the pressure in the fuel tank 1 further increases and finally stops the fuel feeding operation automatically. In this case, the small opening 46c is closed by the second valve body 41d. Thereafter, in accordance with reduction of the pressure in the fuel tank 1, the liquid level H1 in the float chamber 38 falls down to the filled-up fuel surface level H.

In this case, if there are no second ventilation holes 36 opened on the side wall portion of the casing 31, the inside space of the float chamber 38 will become a closed space. The pressure in the float chamber 38 will push the float 41' upward and the packing 47 engaged around the first valve body 46 is brought into contact with the valve seat 34. As the packing 47 is not released from the valve seat 34 in this case, the fill-up control valve device 30' cannot function as a fuel leak prevention valve.

On the other hand, the above-described embodiment of the present invention provides the small-diameter second ventilation holes 36 opened at the upper portion of the casing 31 under the flange 35 where the second ventilation holes 36 are not soaked into the fuel and surely provide the spatial communication between the inside space of fuel tank 1 and the float chamber 38. The inside pressure of the float chamber 38 is immediately equalized with the inside pressure of the fuel tank 1. Thus, the inside pressure of the float chamber 38 can promptly follow the reduction of the inside pressure of the fuel tank 1. As a result, the packing 47 is released from the valve seat 34. The spatial communication among the float chamber 38, the fuel tank 1, and the ventilation passage 5 is established. Accordingly, the fill-up control valve device 30' can function as the fuel leak prevention valve.

In general, a force for bringing the valve body into contact with the valve seat becomes large in proportion to the radius of the valve body. Accordingly, a force required to release the packing 47 from the valve seat 34 is large as the upper opening 32 is relatively large in diameter or size. Hence, the valve seat 34 is not released from the valve seat 34 in the condition that the inside pressure of the fuel tank 1 is slightly decreased. Accordingly, to open the valve at an early timing, the fuel tank 1 needs to be equipped with at least one fuel leak prevention valve as disclosed in the first embodiment of the present invention. However, this embodiment provides the small opening 46c which is small in diameter or side compared with the upper opening 32. The second valve body 41d integrally formed with the float 41' opens or closes the small opening 46c. Thus, no fuel leak prevention valve is required.

More specifically, the closing force of second valve body 41d for closing the small opening 46c is very weak. Thus, the second valve body 41d can open the small opening 46c in response to a few reduction in the inside pressure of the fuel tank 1 as shown in FIG. 5. Once the small opening 46c is opened, the air is introduced into the float chamber 38 from the ventilation passage 5. The inside pressure of the float chamber 38 decreases immediately. As a result, the first valve body 46 is opened too. In this manner, without using the conventional fuel leak prevention valve, the fill-up control valve device 30' can function as the fuel leak prevention valve at the early timing. It becomes possible to omit or remove all or many of the conventionally used fuel leak prevention valves.

Furthermore, arranging the large-diameter first valve body 46 and the small-diameter second valve body 41d into a layered structure is effective in downsizing the valve body and reducing the fuel permeation amount.

FIG. 6 is a schematic view showing an integrated arrangement of the fill-up control valve device 30' and the fuel pump unit 6. As shown in FIG. 6, the fuel pump unit 6 includes a pump main body 6a and a filter 6b attached to the bottom portion of the pump main body 6a. The fuel pump unit 6 is attached to the upper portion of the fuel tank 1 via the flange 35.

According to the arrangement shown in FIG. 6, the flange 35 of the fill-up control valve device 30' is used to attach the fuel pump unit 6 to the upper portion of the fuel tank 1. Thus, it becomes possible to reduce the area required to attach the fill-up control valve device 30' and the fuel pump unit 6 to the fuel tank 1. Furthermore, the number of required flange parts can be reduced, and accordingly the required assembling processes can be simplified.

The present invention is not limited to the above-described embodiments, and accordingly can be modified in various ways without departing from the gist of the present invention.

EFFECT OF THE INVENTION

According to the present invention, at least one second ventilation hole is opened at the upper portion of the casing to provide spatial communication between the float chamber and the fuel tank. The second ventilation hole is small in diameter or size compared with the first ventilation hole. The fill-up control valve of this invention functions as a fuel leak prevention valve capable of reducing or suppressing the pressure change occurring in the fuel tank. It is thus possible to remove or omit many of conventionally used fuel leak prevention valves. The fuel permeation amount can be reduced. Furthermore, the total number of constituent parts becomes small. The assembling processes can be simplified. Accordingly, the production cost can be reduced.

Preferably, the casing has a flange through which the casing is attached to the fuel tank, and a fuel pump unit is attached to the flange. Thus, no special or additional flange is necessary for attaching the fuel pump unit to the fuel tank. The fuel permeation amount decreases correspondingly. The total number of constituent parts becomes small. The assembling processes can be simplified. Accordingly, the production cost can be reduced.

Preferably, the ventilation passage is connected to another ventilation passage in the vicinity of the valve body, and this another ventilation passage has a hole size smaller than the ventilation passage and has the other end being connected to the fuel tank. This arrangement makes it possible to promptly reduce the pressure difference between the upstream and downstream sides of the valve body occurring when the filled-up fuel in the fuel tank brings this valve body into contact with the valve seat. Thus, this arrangement is effective in opening the valve body quickly so that the fill-up control valve can sufficiently function as the fuel leak prevention valve. As a result, it becomes possible to omit or remove many of the conventionally used fuel leak prevention valves while only one is left. The fuel permeation amount decreases correspondingly. The total number of constituent parts becomes small. The assembling processes can be simplified. Accordingly, the production cost can be reduced.

Preferably, the valve body provided at the upper portion of the float is constituted by a large-diameter first valve body and a small-diameter second valve body which operate individually. With this arrangement, the small-diameter second valve body opens in response to a small reduction in the fuel tank pressure after the fuel tank is filled up with the fuel. Especially, the fill-up control valve can function as the fuel leak prevention valve at an earlier timing without providing additional small-diameter ventilation passage. As a result, it becomes possible to omit or remove all of the conventionally used fuel leak prevention valves. The fuel permeation amount decreases correspondingly. The total number of constituent parts becomes small. The assembling processes can be simplified. Accordingly, the production cost can be reduced.

Preferably, the first valve body and the second valve body are arranged into a layered structure. This arrangement is effective in downsizing the valve body. The fuel permeation amount decreases correspondingly. The total number of constituent parts becomes small. The assembling processes can be simplified. Accordingly, the production cost can be reduced.

What is claimed is:

1. A fill-up control valve structure comprising a casing attached to a fuel tank, a float provided in a float chamber defined in said casing so as to cause an up-and-down movement, a valve body provided at an upper portion of said float, a ventilation passage communicating with a downstream side of said valve body, and at least one first ventilation hole opened at a lower part of said casing to connect the float chamber of the casing and an inside space of said fuel tank, wherein said first ventilation hole allows fuel to enter from the inside space of the fuel tank into said float chamber of the casing, said float rises upward when pushed by the fuel introduced into said float chamber via said first ventilation hole, at least one second ventilation hole is provided at an upper part of said casing to connect said float chamber of the casing and the inside space of said fuel tank, and a hole size of said second ventilation hole is smaller than that of said first ventilation hole, said casing has a common flange through which said casing is attached to said fuel tank, and a fuel pump unit is attached to said common flange.

2. The fill-up control valve structure in accordance with claim 1, wherein said ventilation passage is connected to another ventilation passage in the vicinity of said valve body, and said another ventilation passage has a hole size smaller than said ventilation passage and has the other end being connected to said fuel tank.

3. The fill-up control valve structure in accordance with claim 1, wherein said valve body provided at the upper portion of said float is constituted by a large-diameter first valve body and a small-diameter second valve body which operate individually.

4. The fill-up control valve structure in accordance with claim 3, wherein said first valve body and said second valve body are arranged into a layered structure.

* * * * *